UNITED STATES PATENT OFFICE.

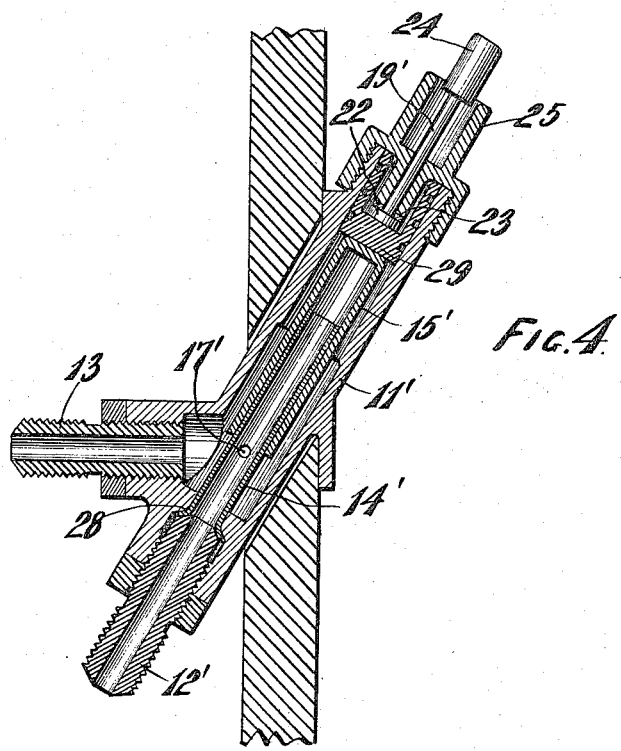

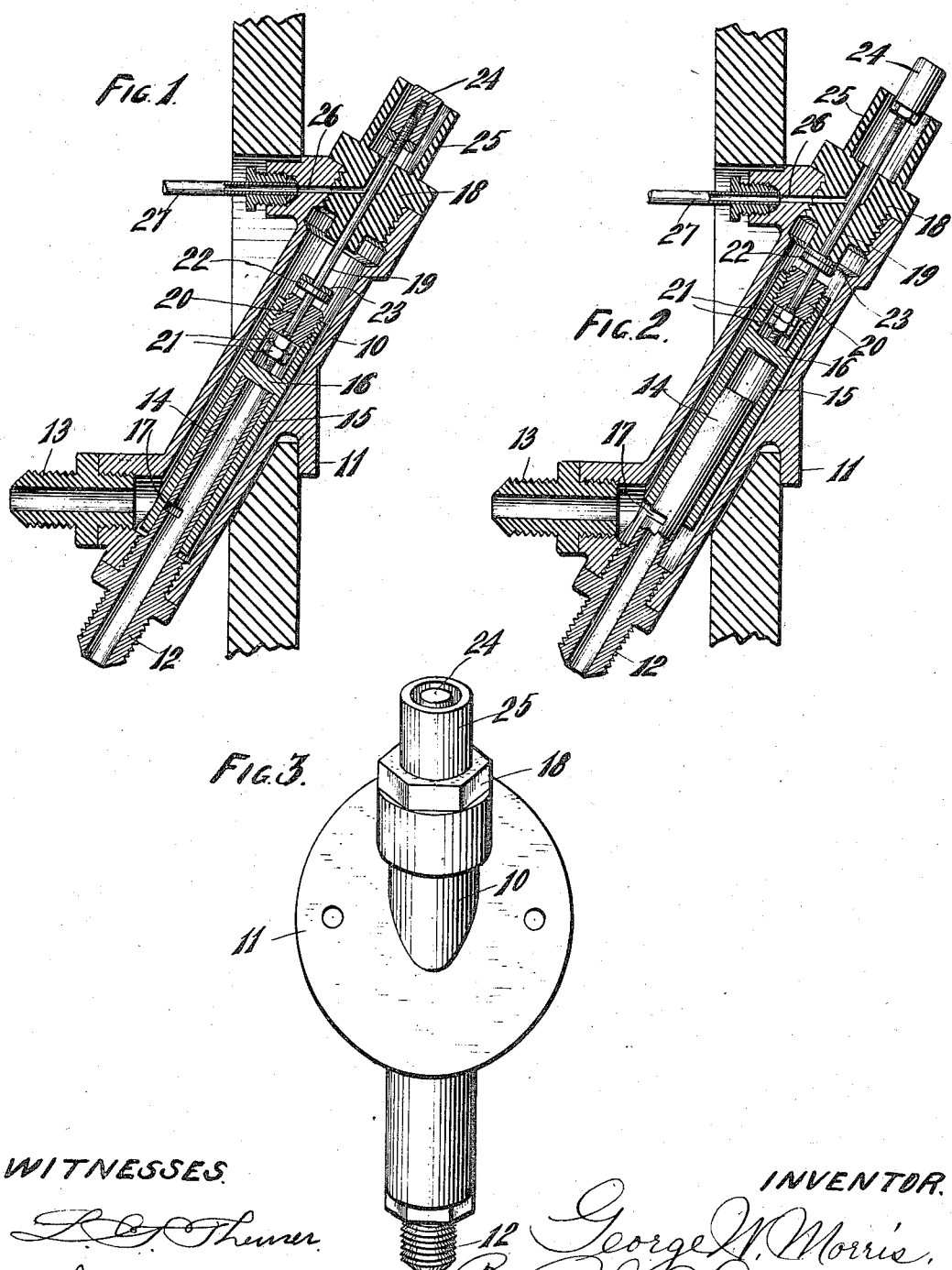

GEORGE WILLIAM MORRIS, OF RACINE, WISCONSIN.

LUBRICATING-SYSTEM INDICATOR.

1,168,953.  Specification of Letters Patent.  Patented Jan. 18, 1916.

Application filed October 10, 1914. Serial No. 866,030.

*To all whom it may concern:*

Be it known that I, GEORGE W. MORRIS, a subject of the King of Great Britain, and resident of Racine, in the county of Racine and State of Wisconsin, have invented new and useful Improvements in Lubricating-System Indicators, of which the following is a description, reference being had to the accompanying drawings, which are a part of this specification.

This invention has for its object to provide an indicator for lubricating systems of the type covered by my co-pending application for Letters Patent Serial No. 860,151, filed September 4th, 1914, with improved details of construction for rendering the piston operated indicating member more sensitive to the influence of pressure in the lubricating system and to insure the pulsating movements thereof incident to the intermittent operation of the lubricant pump.

Another object of the invention is to improve upon details of construction whereby the indicator may be manufactured at less expense and the close fitting parts may be made independent of the casing for convenience in manufacturing and adjusting the same.

Another object of the invention is to provide a return drain for such lubricant as may find its way past the stem of the indicator.

With the above and other objects in view the invention consists in the lubricating system indicator as herein claimed and all equivalents.

Referring to the accompanying drawings in which like characters of reference indicate the same parts in different views; Figure 1 is a vertical sectional view of a lubricating system indicator exemplifying this invention, the parts being shown in the position indicating lack of pressure in the lubricating system. Fig. 2 is a similar view thereof with the parts in the position assumed by them under normal pressure of the lubricating system. Fig. 3 is a front elevation thereof. Fig. 4 is a sectional view of a modified form of a lubricating system indicator also exemplifying this invention, the parts being shown in the position indicating normal pressure of the lubricating system.

In these drawings 10 indicates a tubular casing preferably arranged inclined as shown with a vertical face plate 11 adapted to be secured to the dash board of an automobile or other part to which the indicator is to be attached, and 12 is a nipple forming a pump connection threaded into the lower end of the casing and adapted to be connected with a pipe leading from the lubricant pump, not shown, while 13 is a nipple constituting a lubricant pipe connection threaded into the side of the casing near the bottom thereof and adapted for connection with a pipe for conveying the lubricant to the parts of the engine or other mechanism to be lubricated.

A cylindrical tube 14 forms a projection at one end of the nipple 12 extending into the casing 10 with a tubular plunger 15 slidably fitting thereon and having a closed end wall 16. A slot or outlet opening 17 near the lower end of the tube 14 is covered by the tubular plunger 15 when the latter is in the lower position as shown in Fig. 1, but when subjected to the pressure of the lubricant pump so that it is forced thereby to its upper position shown in Fig. 2 the plunger uncovers the slot or opening 17 and allows the lubricant to pass out therethrough into the interior of the casing 10 from which it flows through the nipple 13 to the parts of the engine or other mechanism to be lubricated. The air entrapped within the dome shaped tubular plunger serves by its compression and expansion to make the flow of lubricant from the casing more constant and also insures the reciprocation of the plunger with each impulse of the lubricant pump.

A screw plug 18 is threaded into the upper end of the casing 10 and has a stem 19 slidably passing therethrough, the lower end of the stem being secured to a screw plug 20 threaded in the upper end of the tubular plunger 15 by means of set nuts 21 threaded on the stem against the screw plug 20. A flange 22 on the stem 19 carries a gasket 23 to be seated against the lower end of the screw plug 18 and prevent the escape of pressure around the stem. A knob or button 24 is secured to the upper end of the stem to indicate the position of the plunger and for convenience in readily determining the two positions of the knob 24 a cup shaped sleeve 25 is formed on the plug 18 surrounding the knob and is of such height that in the lower position of the knob said knob lies beneath or approximately flush with the upper edge of the sleeve and while in the upper position of the knob it stands above the upper edge of the sleeve, thus permitting the position of the knob to be determined by feeling with the hand at night as well as by being seen in the day time. In the event of the lubricant being forced past the stem 19 into the cup shaped sleeve 25 provision is made for draining it through a drain opening 26 leading from the bottom of the sleeve 25 to a pipe connection 27 which will convey it to the drip pan of the engine or any other desired place of discharge.

In operation, the pressure of lubricant received from the lubricant supply pump serves to maintain the tubular plunger 15 in its upper position where it uncovers the outlet opening 17 to permit the flow of lubricant therethrough to the mechanism to be lubricated, such position of the plunger being known to the operator by the position of the knob 24. The form of the tubular plunger is such that it constitutes an air dome in which the air is compressed and permitted to expand with each pulsation of the oil from the lubricant supply pump and consequently the supply of oil is more constant and the plunger and the knob do not remain quite stationary in their upper position as shown in Fig. 2 but show the pump pulsations as long as the supply of lubricant under pressure continues normal. When however there is a failure of the lubricant supply from any cause such as the supply of lubricant becoming exhausted or a faulty operation of the lubricant pump the plunger descends withdrawing the knob 24 within the sleeve 25, thus indicating to the operator that the lubricating system is no longer effective. The construction of the parts is such that the careful fitting of the plunger with relation to the tube 14 and the fitting of the stem within the plug 18 may be made independent of the casing 10 and therefore the device may be more economically manufactured than when the casing itself constitutes a cylinder with a piston fitting therein.

In Fig. 4 a modification of the invention is shown wherein the tube 14' is made independent of the nipple 12' and consists of a tube with a flaring or bell-mouthed lower end held against a flaring seat 28 by the tapering end of the nipple 12'. The opening 17' in the tube 14' is covered or uncovered by the tubular plunger 15' as before but in the present case there is no direct connection between the tubular plunger and the indicator stem. Instead the casing 11' is bored out for a short distance at its upper end and has fitted therein a cup shaped piston 29 with water packing grooves in its outer surface, said piston resting upon the tubular plunger 15' and having the end of the indicator stem 19' bearing thereon. The indicator stem 19' passes through a cap 18' threaded on the upper end of the casing and carries the knob or button 24 as before while sealing the opening through which it passes by means of the flange 22 and gasket 23 as in the other construction. With this form of the invention there is no necessity for draining the cup shaped sleeve 25, for the piston 29 effectively prevents the passage of lubricant therebeyond. With this form of the invention also there is a saving in the cost of manufacture by reason of the tube 14' being made separate from the nipple 12' and in its present form being capable of being made from an ordinary piece of tubing spun or spread to produce the flaring flange at its lower end. The operation of this construction is the same as described.

What I claim as new and desire to secure by Letters Patent is:

1. An indicator for lubricating systems, comprising a casing, a pump connection terminating in a tube within the casing, a tubular plunger surrounding the tube, there being an outlet passageway leading from the casing, said tube having an opening covered by the plunger in one position thereof and uncovered in another position thereof to which it is moved by the pressure of the lubricant through the pump connection, and external means operated by the plunger to indicate the position of the plunger.

2. An indicator for lubricating systems, comprising a casing, a pump connection nipple removably secured to the end thereof and constituting an inlet passageway, a tube forming an extension of the pump connection nipple communicating with the inlet passageway and provided with an opening in the side thereof, a tubular plunger slidably fitting around the tube and in one position closing the said opening but capable of movement under the pressure of lubricant through the inlet passageway to a position uncovering the said opening, there being an outlet passageway from the casing through which the lubricant is discharged, and external means operated by the plunger to indicate the position of the plunger.

3. An indicator for lubricating systems, comprising a casing, a pump connection threaded to the lower end of the casing, a tube on the pump connection with its bore forming a continuation of the inlet passageway through the pump connection, a tubular plunger slidably fitting around the tube and adapted to be lifted by the pressure of the lubricant admitted through the inlet passageway, there being an opening in the tube covered by the plunger in its lower position and uncovered by the plunger in its upper position, a screw cap threaded on the upper end of the casing, and a stem moved by the plunger and passing through the screw cap.

4. An indicator for lubricating systems, comprising a casing, a pump connection threaded in the lower end thereof and forming an inlet passageway, a tube forming an extension of the pump connection with its bore constituting a continuation of the inlet passageway, a tubular plunger slidably fitting upon the tube and adapted to be lifted by the pressure of the lubricant pump through the inlet passageway, there being an opening in the tube covered by the plunger in its lower position and uncovered by the plunger in its upper position, there being an outlet passageway leading from the casing, a screw cap fitting on the upper end of the casing, a stem slidably passing through the screw cap, and a piston fitting within the upper end of the casing and engaging the stem and the tubular plunger respectively.

5. An indicator for lubricating systems, comprising a casing, a pump connection threaded on the lower end thereof and forming an inlet passageway and having a tapering end, there being a flaring seat formed within the casing near the lower end thereof, a tube having a flaring end fitting upon the flaring seat and engaged by the tapering end of the pump connection, a tubular plunger slidably fitting on the tube and adapted to be lifted by the pressure of the lubricant admitted through the inlet passageway, there being an opening in the tube covered by the plunger in its lower position and uncovered by the plunger in its upper position, a screw cap threaded on the upper end of the casing, a stem passing therethrough, and a grooved piston fitting in the upper end of the casing and engaging the stem and the tubular plunger respectively.

In testimony whereof I affix my signature, in presence of two witnesses.

GEORGE WILLIAM MORRIS.

Witnesses:
  THOMAS WILLIAMS,
  F. H. FOSTER.